March 29, 1960 J. R. CAMPBELL 2,930,882
METHOD AND APPARATUS FOR FABRICATING
STRUCTURAL PANEL AND CORE THEREFOR
Filed Feb. 11, 1957 4 Sheets-Sheet 1

JAMES R. CAMPBELL,
INVENTOR.

BY Thomas P. Mahoney
ATTORNEY

JAMES R. CAMPBELL,
INVENTOR.

BY Thomas P. Maloney
ATTORNEY.

United States Patent Office 2,930,882
Patented Mar. 29, 1960

2,930,882

METHOD AND APPARATUS FOR FABRICATING STRUCTURAL PANEL AND CORE THEREFOR

James R. Campbell, Laguna Beach, Calif.

Application February 11, 1957, Serial No. 639,536

23 Claims. (Cl. 219—81)

This invention relates to a method of fabricating a structural panel of the honeycomb type and, more particularly, to a method and apparatus for fabricating the core of such a panel, either as a separate unit or simultaneously with the assembly and fabrication of the core in conjunction with a single surface sheet or plural surface sheets for said core.

It is well known to those skilled in the art that the demand of industry and the armed services for lightweight structural materials is steadily on the increase and that, so far as the armed services are concerned, the need for light-weight, heat resistant structures has been greatly accelerated by the high speeds attained in the flight of aircraft and various types of missiles. Thus, the need for a high temperature resisting, high strength, and relatively easily assembled structural panel has become more acute and it is an object of my invention to provide a method and apparatus for assembling such a panel.

A panel of the character whose method of assembly is disclosed herein is shown and described in my copending application, Serial No. 532,605, filed September 6, 1955, now Patent No. 2,910,153, entitled "Structural Panel of Honeycomb Type."

Many attempts have been made in the past to fabricate honeycomb type core reinforced panels from various types of material. The cores have been fabricated from paper, aluminum foil, stainless steel foil, and the like, and the covering sheets have been fabricated from an equally wide variety of material. In assembling paper and aluminum foil cores, great reliance has been had upon the use of various resin-type adhesives which are applied by spraying, laying on of resin-bearing tapes, or the like, to the interior surfaces of the sheets which the core is to be associated with and which are then applied over the opposite sides of the core to accomplish the bonding thereof under heat and pressure.

One of the major factors militating against the successful utilization of such resin-bonded panels wherein the opposite edges of the core are bonded to the interior surfaces of the sheets therefor by means of resinous adhesives is the fact that there is a considerable addition to the weight of the panel caused by the weight of the adhesive itself which, of course, must be spread across the entire surface of the sheet in order that a proper bond be obtained.

Moreover, in the assembly of conventional core structures formed from aluminum foil, or the like, by the use of resinous adhesives, it is necessary to first assemble the core element individually and then subsequently adhere the opposite edges of the core element to the interior surfaces of the adhesive coated sheets.

It is, therefore, an object of my invention to provide a method and apparatus for assembling a composite panel structure incorporating a honeycomb core wherein the elements of the honeycomb core and the surface sheets therefor can be secured in operative relationship with each other simultaneously, thus eliminating the necessity for prior assembly of the honeycomb core.

Attempts have also been made to provide structural panels incorporating honeycomb-type cores manufactured from stainless steel foil and covered with stainless steel sheets. In most instances, brazing has been the method utilized in causing the affixation of the cores in operative relationship with the stainless steel sheets and such conventional brazing techniques have necessitated the application of brazing materials in paste or other forms to the interior surfaces of the sheets of material to be affixed to the cores in a manner analogous to the application of resinous adhesives discussed hereinabove.

Naturally, the utilization of such brazing materials or fluxes and the necessary application thereof across the interior surfaces of the sheets materially increases the entire weight of the assembly and also results in a bond between the opposite edges of the core and interiors of the sheets which is susceptible to high temperatures and to atmospheric corrosion, resulting in the ultimate separation of the sheets from operative relationship with the associated core. Since the brazing material must be applied in a layer thick enough to develop a fillet at the sharp edged abutment of the core edges to surface sheets, the weight thereof is a substantial component of the overall weight of the ultimate panel.

Another object of my invention is the provision of a method and apparatus for fabricating a structural panel incorporating a honeycomb-type core wherein the necessity for the utilization of adhesives or bonding paste which must be spread across the entire interior surface of the associated covering sheets is eliminated and, therefore, considerable reduction in the weight of the resulting panel is achieved.

In the method and apparatus of my invention, a core structure can be assembled by the simple expedient of inserting the flanges of a wave-formed core strip or element in operative relationship with the flanges of a similarly formed strip and securing the flanges in operative relationship with each other by means of welding, or the like. In the ensuing disclosure, the method and apparatus of my invention will be described as applied to the fabrication of stainless steel core material in association with stainless steel surface sheets, but it is, of course, readily apparent that the principles of my invention can be applied to the fabrication of various types of cores and panels from various types of materials and it is not intended that the scope of the invention be limited to the specific material utilized in either the core or the surface sheets therefor, nor to the weld of the core and surface sheets in operative relationship.

The essential thing is that, by applying the means of securement of the core to the panels to the opposite flanges of the core, it is possible to eliminate the need for coating the interior surfaces of the associated covering sheet. This is attributable to the fact that the flanges of the core strips or elements provide ample surface area for applying any type of adhesive material, if such adhesive material appears to be indicated by the desired use of the product, or provide, also, ample welding areas for the weldment of the core elements in operative association with each other and with surface sheets therefor.

Another object of my invention is the provision of an apparatus for forming a composite panel of the honeycomb core, reinforced type which includes means for supporting the surface sheets of such a panel in spaced relationship with each other, whereby the core strips or elements can be inserted in the space between the panels and said strips operatively connected to each other during the process of their being operatively connected to the surface sheets. Obviously, such an apparatus materially reduces the costly expenditure of time and labor entailed in the prior fabrication of the core stock before the application thereto of the surface sheets takes place.

An additional object of my invention is the provision of an apparatus of the aforementioned character whereby the core strips or elements and surface sheets can be welded in operative relationship with each other at a single pass of the welding head means incorporated therein without materially affecting the character of the core stock or the surface sheets therefor.

A further object of my invention is the provision, in an apparatus of the aforementioned character, of welding current supply means which permit the core material to be secured to the interior surfaces of the surface sheets without creating excessive temperatures within the core material and without eddy currents or by-pass currents deviating from the weld zone so as to make current control difficult. An additional object of my invention is the provision of welding current supply means which allows for the proportioning of weld currents so as to facilitate the simultaneous attachment of a pair of faces of substantially different thickness.

Other objects and advantages of my invention will be apparent from the following specification and the accompanying drawings which are for the purpose of illustration only and in which.

Figure 1:
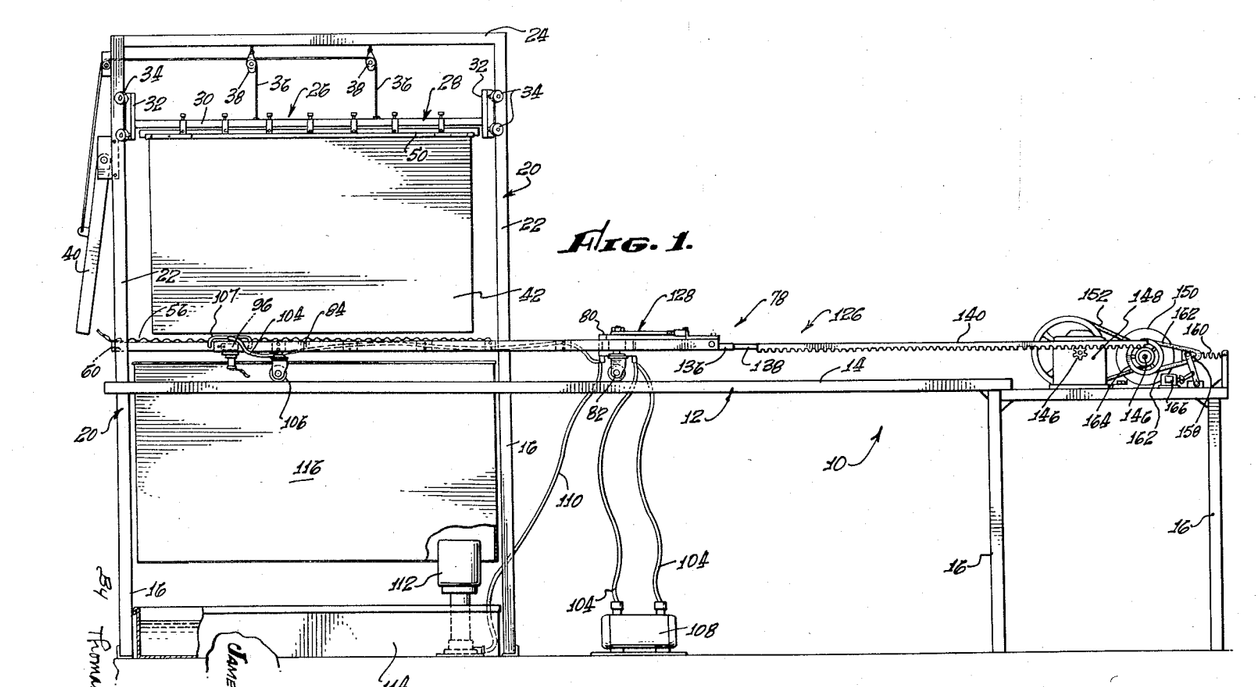
Fig. 1 is a side elevational view of an apparatus constructed in accordance with the teachings of my invention.

Referring to the drawings and particularly to Figs 1-10 thereof, I show an apparatus 10 constructed in accordance with the teachings of my invention, said apparatus including a frame 12, as best shown in Fig. 1 of the drawings, and said frame incorporating a bed 14 supported upon a plurality of vertical support members 16.

Figure 2:
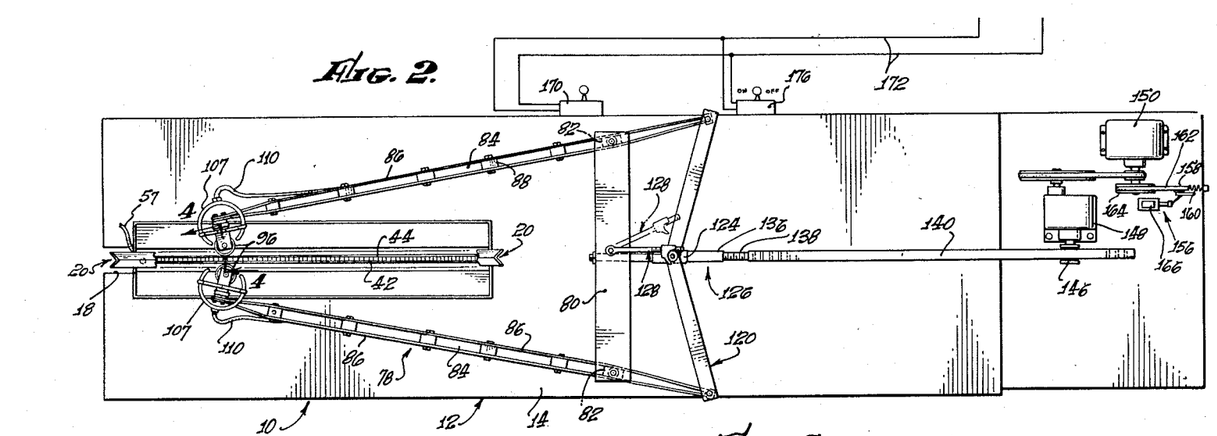
Fig. 2 is a top plan view of the apparatus.

An elongated slot 18 is formed in the bed 14 at the left-hand extremity thereof, as best shown in Fig. 2 of the drawings, and a pair of track members 20 constituted by angle irons 22 extends upwardly through the slot 18, the upper extremities of said angle irons being secured in spaced relationship with each other by a transverse connector 24.

Figures 6, 7:
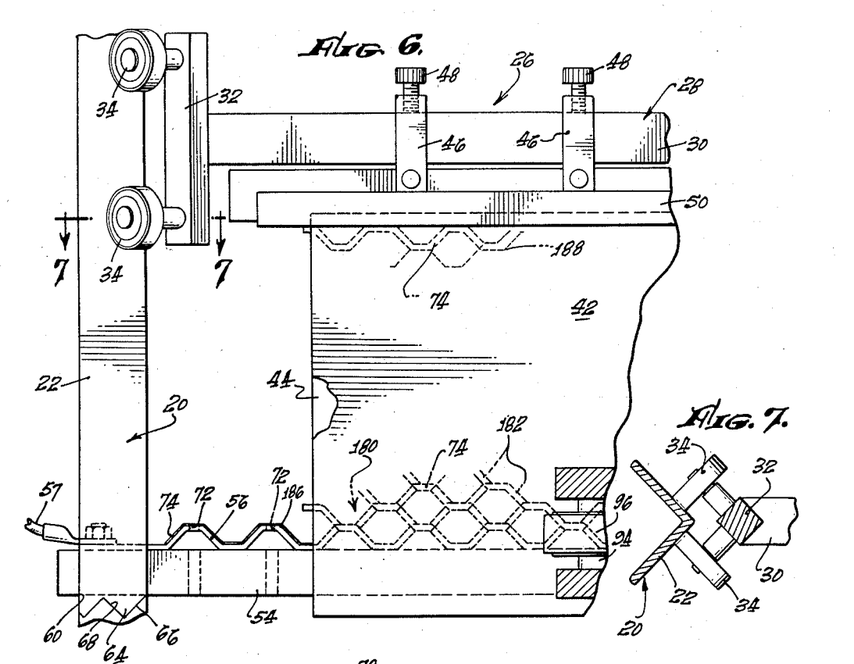
Fig. 6 is an enlarged, fragmentary, side elevational view of a portion of the apparatus.
Fig. 7 is a transverse, sectional view taken on the broken line 7—7 of Fig. 6.

Mounted for movement on the track members 20 is a carriage 26, said carriage including a horizontally oriented carrier 28 incorporating an elongated supporting bar 30 whose opposite ends are secured, as best shown in Figs. 1 and 6 of the drawings, to vertically oriented mounting blocks 32 in which are journaled track engaging rollers 34.

Operatively secured to the supporting bar 30 of the carriage 26 are cables 36, said cables being entrained in pulleys 38 and being connected at their extremities to a lever 40 adapted to raise or lower the same and thus accomplish concomitant raising or lowering of the carriage 26. As the carriage is raised or lowered, the rollers 34 move up and down the tracks 20 and thus support the carriage 26 therebetween. It should be noted that the lever 40 also serves as a counterweight and is capable of maintaining the carriage 26 in elevated position, despite the weight of surface sheets 42 and 44 suspended therefrom in spaced relationship with each other.

Suspended from the supporting bar 30 of the carrier 28 of the carriage 26 by means of yokes 46 having adjustment screws 48 operatively associated therewith is a clamp 50 in which the upper extremities of the surface sheets or skins 42 and 44 are secured to maintain them in spaced relationship with each other and permit said surface sheets to be correspondingly raised or lowered with the raising or lowering of the carriage 26 and, more particularly, the carrier 28 thereof.

Secured between the vertically oriented track members 20 is a transversely oriented frame member 54 upon which is supported an electrode 56, said electrode 56 being formed from copper or other conductive material and being, as best shown in Fig. 6 of the drawings, of corrugated or wave-form configuration. One extremity of the electrode 56 can be connected by means of a lead 57 to a suitable source of welding potential if it is necessitated by the type of welding supply circuit provided for use in conjunction with the apparatus of my invention and necessitated by the practice of the method thereof.

Figures 3, 4, 5:
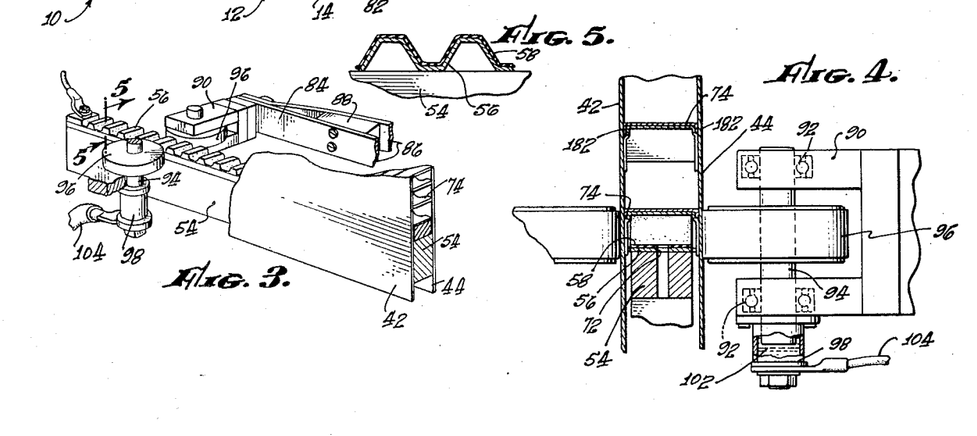
Fig. 3 is an enlarged, fragmentary, sectional view showing details of certain component parts of the apparatus.
Fig. 4 is a transverse, sectional view showing the apparatus of Fig. 2.
Fig. 5 is a transverse, sectional view taken on the broken line 5—5 of Fig. 3.

If desired, the upper surface of the electrode 56 can be coated with a suitable insulating material 58, as best shown in Figs. 4 and 5 of the drawings, whereby only the lateral edges of the electrode 56 are exposed and thus no current is passed from the electrode into the core strip or element mounted thereupon through the upper surface thereof, in a manner to be described in greater detail below.

Formed in the track members 20 for the reception of the opposite extremities of the frame member 54 which supports the electrode 56 are openings 60 which permit the frame member 54 to be shifted longitudinally with respect to the track members 20 in order that the electrode 56 may be correspondingly shifted to accomplish the simultaneous shifting of a core strip or element mounted thereupon, for a purpose which will be described in greater detail below.

Formed upon the underside of the frame member 54 is indexing means 64, said indexing means being adapted to control the longitudinal shifting of the frame member 54 and thus the electrode 56 supported thereupon. The indexing means 64 is constituted by a plurality of serrations 66 which mate with corresponding serrations 68 provided in the track members 20.

If desired, the electrode 56 may be provided with a plurality of vacuum openings 72, said openings communicating with a vacuum manifold, not shown, to insure that a core strip or element 74, such as that shown in Fig. 4 of the drawings, will be properly located upon and adhere to the upper surface of the electrode 56.

Mounted upon the frame 12 of the apparatus 10 for movement with respect to the bed 14 is welding head means, indicated generally at 78, said welding head means including an elongated, reciprocable carriage 80 which is mounted at its opposite extremities on casters 82 engageable with the upper surface of the bed 14 of the apparatus 10. Pivotally supported on the opposite extremities of the carriage 80 are elongated arms 84, said arms being formed from parallel lengths 86 of spring steel maintained in operative and spaced relationship with each other by means of securement blocks 88.

Secured to the forward or left-hand extremities of the arms 84, as best shown in Figs. 1–4 of the drawings, are nonconductive yokes 90, said yokes supporting bearings 92 in which are journaled the opposite extremities of a shaft 94. Mounted intermediate the ends of the shaft 94 is a seam welding roller 96. The lower extremity of the shaft 94 is encompassed by a housing 98 and in contact with a conductive bath 102 of mercury, or the like, which engages the lower extremity of said shaft to conduct welding current from a lead 104 to the welding roller 96.

The left-hand extremities of the arms 84 are supported upon casters 106 to facilitate the longitudinal translation of the welding rollers 96 constituting a portion of the welding head means 78. The leads 104 connected to the welding rollers 96 in the above described manner are connected to a welding transformer 108 which supplies welding current to the rollers 96.

Mounted upon the left-hand extremities of the arms 84 in juxtaposition to the welding roller 96 are spray heads 107 which are connected by means of flexible tubing 110 to a pump 112, said pump, in turn, communicating with a reservoir 114 which serves to collect water dripping downwardly from the spray heads for recirculation by the pump 112. A spray shield 116 is also provided underneath the slot 18 in the bed 14 to prevent the spattering or splashing of water from the spray heads 107.

Figure 8:
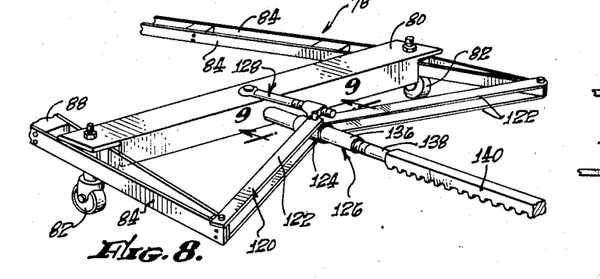
Fig. 8 is an enlarged, fragmentary, sectional view showing a portion of the welding head means carriage of the apparatus.
Figure 9:
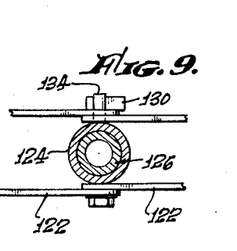
Fig. 9 is a transverse, sectional view taken on the broken line 9—9 of Fig. 8.

A toggle linkage 120 is operatively secured, as best shown in Fig. 2 of the drawings, to the inner extremities of the arms 84, said toggle linkage being constituted, as best shown in Fig. 8 of the drawings, by superimposed links 122 whose outer extremities are pivotally connected to the arms 84 and whose inner extremities are pivotally connected to a tubular member 124 which is slidable on the exterior of a connecting rod 126.

The left-hand extremity of the connecting rod 126 is secured to the supporting carriage 80 of the welding head means 78 and adapted to cause longitudinal movement of the same, in a manner to be described in greater detail below.

Figure 10:
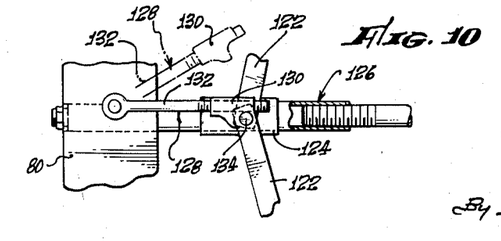
Fig. 10 is an enlarged, top plan view showing the mode of operation of a portion of the apparatus of my invention.

Mounted for pivotal movement on the supporting carriage 80 is a latch member 128, said latch member, as best shown in Fig. 10 of the drawings, having a head 130 threadedly engaged upon the shank 132 thereof. The head 130 is provided with a hook-shaped portion engageable with a pin 134 on the collar 124 in the manner shown in Figs. 1–2 and 8–10 of the drawings to maintain the arms 84 of the welding head means 78 biased inwardly and thus to maintain the welding rollers 96 in intimate contact with the exterior surfaces of the surface sheets or skins 42 and 44 of the panel being welded.

It will be noted that the latch member 128 can be moved into the release position shown in phantom in Figs. 2 and 8 of the drawings wherein the head 130 thereof is disengaged from operative relationship with the pin 134. Such inoperative position of the latch member 128 permits the release of the toggle linkage 120 which, in turn, permits the inherent resilience of the arms 84 to return the linkage 120 into an inoperative position wherein the pressure exerted thereby upon the arms 84 of the welding head means 78 is released, thus releasing the welding rollers 96 from operative relationship with the exterior surfaces of the sheets or skins 42 and 44.

The adjustability of the head 130 of the latch member 128 upon the shank 132 thereof permits the pressure exerted upon the interior surfaces of the surface sheets or skins 42 and 44 to be adjusted, thus determining the pressure which the welding rollers 96 are subjected to by the action of the arms 84 upon which they are mounted.

As previously indicated, a connecting rod 126 is secured at one extremity to the supporting carriage 80 of the welding head means 78. The connecting rod 126 includes a tubular element 136 connected by means of a threaded connector 138 to an elongated rack 140. The elongated rack 140 is entrained upon a pinion 146 connected to a speed reducer 148 which is driven by an electric motor 150 connected thereto by means of a belt 152.

Operatively associated with the motor 150 is a brake 156, said brake including a shoe 158 urged by a tension spring 160 into engagement with a braking belt 162 which is entrained upon a sheave 164 secured to the drive shaft of the motor 150. A solenoid 166 is operatively connected to the brake shoe 158 and serves to retract said shoe from engagement with the braking belt 162 when the motor 150 is energized by a switch 170 operatively connected thereto through leads 172.

The tension spring 160 normally pulls the brake shoe 158 into engagement with the braking belt 162 and thus serves to prevent free rotation of the sheave 164 upon which said belt is entrained. Its function in this regard is to immediately de-energize the motor 150 upon the throwing of the control switch 170 into a position wherein it will terminate flow of current to said motor so that coasting of the welding head means 78 may be prevented. However, when the switch 170 is thrown to energize the motor 150, the solenoid 166 is immediately energized to withdraw the brake shoe 158 from braking engagement with the brake belt 162 in order to permit immediate rotation of the motor 150 and immediate longitudinal translation of the rack 140 to cause concomitant longitudinal translation of the welding head means 78, in a manner to be described in greater detail below. Of course, rotation of the motor 150 can be reversed to cause reversal of movement of the pinion 146 and thus reversal of movement of the rack 140.

The flow of water to the spray heads 107 associated with the welding rollers 96 is controlled by a switch 176, said switch being connected to the supply leads 172. However, if desired, energization of the pump 112 can be accomplished simultaneously with the energization of the motor 150 by connecting the pump leads, not shown, directly to the motor switch 170 in a conventional manner.

In utilizing the apparatus 10 of my invention, a pair of surface sheets or skins 42 and 44 is suspended in the clamping means 50 supported on the carriage 26. When so supported on the carriage 26, the sheets 42 and 44 are disposed in spaced relationship, as best shown in Fig. 4 of the drawings, for the reception of a core 180 constituted by a plurality of internested, superimposed core strips or elements 74, again as best shown in Fig. 4 of the drawings.

While the fabrication of a complete panel constituted by a core and external sheets 42 and 44 will be described hereinbelow, it should be understood that the apparatus 10 of my invention can be utilized to fabricate a core without the surface sheets 42 and 44 and a panel consisting of the core and only one surface sheet.

For instance, in fabricating a core, the surface sheets 42 and 44 are omitted and the core strips or elements 74 are superimposed, one upon the other, and welded together in the same manner as will be described in describing the assembly and welding of the core within the surface sheets of a panel.

After the surface sheets 42 and 44 have been clamped in the clamping means 50 of the carriage 26, they are raised so that the lower extremities thereof will clear the electrode 56, such raising of the sheets being accomplished by downward movement of the lever 40 which causes corresponding upward movement of the cables 36 and the carriage 26.

When the carriage 26 has caused the lower extremities of the sheets 42 and 44 to clear the electrode 56, a core element 74 is superimposed upon the electrode 56 in the manner shown in Figs. 4 and 6 of the drawings. At the same time, the vacuum may be applied to the openings 72 in the electrode 56 to insure registry of the core elements 74 therewith. At this juncture and for purposes of facilitating the understanding of the method of the invention, it should be pointed out that each of the core elements is of corrugated or wave-form configuration and is provided, as shown and described in my above referenced application and as indicated in Fig. 4 of the drawings, with oppositely disposed flanges 182.

The flanges on each of the core strips or elements 74 are insertible within the flanges of an adjacent core strip or element, as best shown in Fig. 6 of the drawings, so that the flanges 182 of adjacent core strips or elements 74 may be welded or otherwise secured to each other, in a manner to be described in greater detail below.

The fact that the core elements 74 may be physically connected to one another prior to their weldment in operative relationship with one another is one of the factors which facilitates the practice of the method of my invention and which facilitates the creation of an excellent bond between the core strips or elements 74 themselves and the surface sheets 42 and 44 which are operatively associated therewith.

When a core strip or element 74 has been properly disposed upon the electrode 56, the surface sheets 42 and 44 are lowered into a lowermost position in which the core strip 74 assumes the relationship with the sheets 42 and 44 of the core strip 74 shown in the uppermost part of the panel constituted by the sheets 42 and 44 in Fig. 6 of the drawings. It is obvious, therefore, that relative movement between the sheets 42 and 44 and the core strip 74 must take place to properly locate the core strips 74 with reference to the sheets 42 and 44.

After such relative movement has been accomplished to properly locate the core strip or element 74, the welding head means 78 is caused to traverse the exteriors of the surface sheets 42 and 44 by bringing the welding rollers 96 in contact with said surfaces and by energizing the motor 150. Energization of the motor 150 causes rotation of the pinion 146 and longitudinal translation of the rack 140 which, in turn, causes longitudinal translation of the supporting carriage 80 and the arms 84 mounted thereupon, resulting in lineal movement of the welding rollers 96 over the adjacent surfaces of the sheets 42 and 44 and over the flanges 182 of the core strip or element 74 located between said sheets.

As the rack 140 is driven by the associated pinion 146 in a left-hand direction, as viewed in Figs. 1–2 of the drawings, the supporting carriage 80 traverses the surface of the bed 14 of the apparatus 10 and the welding rollers 96 are translated linearly across the exterior surfaces of the surface sheets 42 and 44 to cause the weldment of the core element 74 mounted upon the electrode to the interior surfaces of the sheets 42 and 44. During the welding operation, water sprayed from the spray heads 107 upon the welding rollers 96 and the surfaces being welded materially reduces the heat generated by the welding process. If desired, a supply of cooling water can also be sprayed upon the electrode 56 in the space between the interior surfaces of the sheets or skins 42 and 44.

It should be noted that the provision of the flanges 182 upon the opposite edges of the core element or strip 74 greatly facilitates the welding of the strip to the interior surfaces of the sheets or skins 42 and 44 and permits a uniform bond to be created therebetween. After the first core element or strip 74 has been welded in the above described manner, the toggle linkage 120 is released by disengagement of the latch member 128 from operative relationship with the pin 134, thus permitting the toggle linkage 120 to move into its released position and releasing the pressure on the arms 84 and thus on the welding rollers 96.

After such release of the welding rollers 96, the carriage 26 can be shifted upwardly to carry the assembly of the surface sheets 42 and 44 and the core element 74 welded therebetween upwardly to clear the electrode 56 and to permit another core element 74 to be mounted thereupon. After another core element 74 has been properly mounted upon the electrode 56, the frame member 54 supporting the core element is shifted to shift the core element 74 on the electrode 56 one-half wave length out of phase with the previously welded core element in order that the apexes 186 of the core element 74 on the electrode 56 may be registered with the bases 188 between the apexes of the previously welded core element 74 and thus permit the insertion of the flanges at the apexes 186 of the core element being installed within the flanges on the core element already installed between the sheets 42 and 44.

After the positioning of the core element 74 on the electrode 56 has been accomplished and the phase shift of the core element 74 with the electrode 56 has taken place, the sheets 42 and 44 are once again lowered by downward movement of the carriage 26. Such downward movement of the carriage 26 permits the initially installed core element 74 to engage the core element resting on the electrode 56 and the flanges on the apexes 186 of the core element 74 on the electrode 56 are urged into corresponding flanges on the basal portions 188 of the previously installed core element by the weight of the assembly itself and the weight of the carriage 26. Thus, the interfitting of the flanges of the core element 74 is accomplished and the welding operation can be once again initiated by energization of the drive motor 150 to cause corresponding longitudinal movement of the carriage 80 and the welding head means 78 incorporating the same across the exterior surfaces of the sheets 42 and 44.

Longitudinal movement of the welding head means 78 in this manner causes longitudinal translation of the welding rollers 96 and corresponding affixation and weldment of the core elements 74 to each other at the internested flanges and with the interior surfaces of the opposed sheets. In this manner, simultaneous affixation of the core elements to each other and to the interior surfaces of the sheets 42 and 44 is accomplished resulting in a homogeneous core structure and in the creation of a triple bond between the flanges and the interior surfaces of the adjacent sheet 42 or 44.

It is thus readily apparent that the core 180 can be created within the space defined by the opposed sheets 42 and 44 by the continued affixation of additional core strips 74 to each other and to the sheets 42 and 44 in the above described manner. Although during the course of the description of the method of assembly of a panel constituted by the core 180 and the sheets 42 and 44 I have referred to the electrode 56, it is not intended to limit the assembly of the panel to the use of such an electrode because it is possible to assemble the above described components in operative relationship with one another by the use of a conductor which is not directly connected to a source of potential by a lead such as the lead 57. However, it should be pointed out that I have obtained the most desirable results by the use of an electrode such as the electrode 56 connected in a welding circuit, in a manner to be described in greater detail below.

If the assembly of a core structure without surface sheets 42 and 44 is desired, the sheets 42 and 44 can be omitted and a core structure created by the interengagement of successive core elements or strips 74 with each other and the successive weldment of the same by the welding head means 78 in a manner identical to that in which the above described panel is fabricated. Moreover, if desired, one surface sheet can be secured to the flanges on one side of the core structure and the other side of the core structure consists merely of the core strips 74 welded to one another. Further, it is most practical to secure surface sheets of different thickness to opposite sides of a core element.

The length of stroke of the welding head means 78, as determined by the longitudinal translation of the supporting carriage 80, can be adjusted by adjustment of the threaded connector 138 between the tubular element 136 connected to said carriage and the rack 140 in the appropriate direction. Moreover, the pressure with which the welding rollers 96 are applied to the exterior surfaces of the sheets 42 and 44 can be adjusted by adjustment of the latch member 128 and, more particularly, the head 130 thereof upon the shank 132 to cause greater pressure to be imposed upon the arms 84 mounting the rollers 96 through the toggle linkage 120.

Although I have described the use of welding rollers 96 to create a weld between the external sheets 42 and 44, I do not intend to be limited to the specific type of welding element utilized in the welding head means 78 and it is conceivable that other types of welding head means may be substituted for the specific means disclosed herein.

Figure 13:
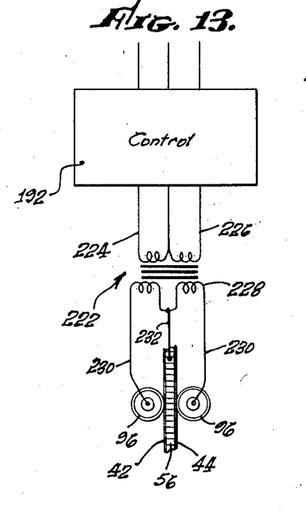
Fig. 13 is a circuit diagram of yet another form of welding control circuit.
Figure 14:
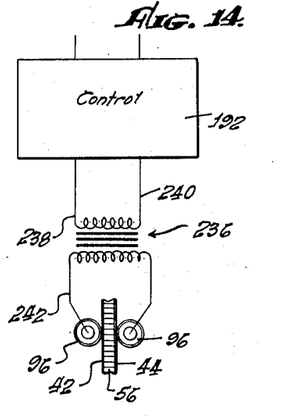
Fig. 14 is a circuit diagram showing yet another type of welding control circuit.
Figure 15:
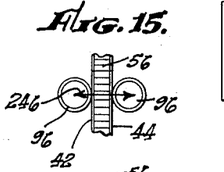
Fig. 15 is a diagrammatic view showing welding current flow.
Figure 16:
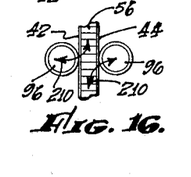
Fig. 16 is a schematic view showing welding current flow when another type of welding control circuit is utilized from that which creates the current flow pattern shown in Fig. 15.

Various types of welding circuits utilized in securing the core elements 74 to the surface sheets 42 and 44 are shown in Figs. 11-14 of the drawings and Figs. 15 and 16 are diagrammatic showings of the current flow pattern obtained by the use of specific ones of the welding circuits shown.

Figure 11:
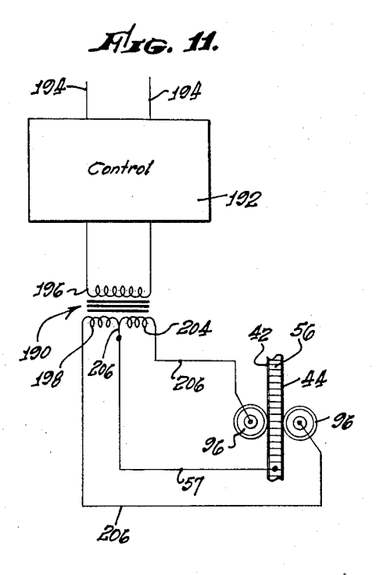
Fig. 11 is a schematic circuit diagram of a welding control circuit utilized in the apparatus of my invention.

A welding transformer 190 is connected, as best shown in Fig. 11 of the drawings, to a welding control 192 of conventional character, said welding control being connected to a source of potential by leads 194. The primary of the welding transformer 190 is indicated at 196, said primary being associated with oppositely wound secondaries 198 and 204. The outer ends of the secondaries are connected by means of leads 206 to their associated welding rollers 96, while the electrode 56 is connected to a terminal 208 between the inner extremities of the secondaries 198 and 204 by means of the leads 57. By the provision of a welding circuit of the above described character, current flow from one surface sheet 42 to the second surface sheet 44 through the interposed strip 74 and the electrode 56 is eliminated, thus preventing deterioration of the core strip or element 74 by the heat generated during the welding process, and also preventing eddy or by-pass currents which represent lost current and make control difficult.

The current flow pattern obtained by the use of the welding circuit shown in Fig. 11 of the drawings is graphically illustrated in Fig. 16 wherein the arrows 210 represent the welding current flow between the electrode 56 and the welding rollers 96 and it is apparent that there is established a welding current pattern whereby the flanges 182 on the opposite edges of a core strip or element 74 being welded are secured to the surface sheets 42 and 44 and each other by welding current flow between the electrode 56 and the welding rollers 96 and not through the core strip 74.

Thus, it is possible by the use of a welding circuit of the character of Fig. 11 to weld the core strips between the sheets 42 and 44 without the necessity for providing additional conducting means such as electroplated copper coating to transmit the welding current through the core strip without destroying the same because of the excessive temperatures created during the welding process. Of importance also in considering the welding circuit of Fig. 11 is the fact that the reversely wound secondaries 198 and 204 eliminate saturation of the secondary of the transformer 190 characteristic of half-cycle welding circuits of conventional construction.

Figure 12:
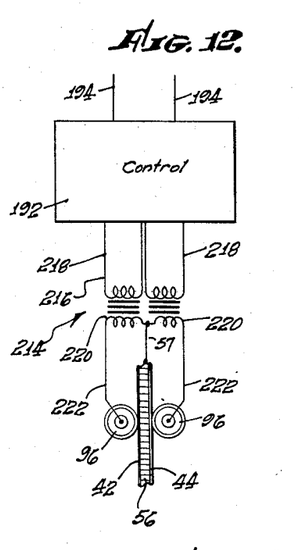
Fig. 12 is a circuit diagram of another form of welding control circuit.

An alternative welding circuit 214 is shown in Fig. 12 of the drawings, said welding circuit including two transformers 216 which each include a primary 218 and a secondary 220. One extremity of each of the secondaries 220 is connected by a lead 222 to an associated welding roller 96 while the electrode 56 is connected by a lead 57 connected to the other extremities of the secondaries 220. By the provision of the welding circuit 214, a welding pattern such as that diagrammatically shown in Fig. 16, as previously described in detail in discussing the welding circuit of Fig. 11, is obtained with the desirable results and advantages incident thereto. With this circuit it is possible to adjust the relative outputs of the two transformers and thus secure surface sheets having widely different thicknesses or different properties to the opposite edges of the core.

Another welding circuit 222 is shown in Fig. 13 of the drawings as including a transformer 224 which incorporates a three-phase primary 226 which is open-delta connected to a secondary 228. The opposite extremities of the secondary 228 are connected by leads 230 to welding rollers 96 and the electrode 56 is connected intermediate the extremities of the secondary 228 by a lead 232. The use of a welding circuit such as that shown in Fig. 13 of the drawings results in the partial establishment of the desirable welding pattern shown in Fig. 16 and previously described hereinabove. However, from the economic standpoint of power costs and balanced line look, this has advantages.

A conventional welding circuit 236 is shown in Fig. 14 of the drawings, said welding circuit including a transformer 238 which incorporates a primary 240 and a secondary 242 whose opposite extremities are connected to the welding rollers 96. It will be noted that instead of utilizing the electrode 56 in the space between the surface sheets 42 and 44 and superimposing a core strip or element 74 thereupon, a conductor 56' of the same configuration as the electrode 56 is utilized. The distinction between the conductor 56' and the electrode 56 is that there is no positive connection of the conductor 56' to the welding circuit so that the welding current passes in the pattern shown by the arrow 246 of the drawings from one welding roller 96 through the juxtaposed skin through the conductor 56' and the core strip or element 74 mounted thereupon, thence through the juxtaposed exterior sheet and to the adjacent welding roller.

The consequences of the use of such a conventional welding circuit are obvious when consideration is given to the fact that a certain portion of the welding current must pass through the core strip or member 74 disposed upon the conductor 56' and through the core strips previously secured to the surface sheets. This tends to create relatively high temperatures in said core strip and eddy and by-pass currents in said core strips which are not encountered when welding circuits of the character of those disclosed and shown in Figs. 11-13 of the drawings are utilized. It is possible, however, by the use of the circuit 236 to obtain a satisfactory weld, but it is recommended that one of the circuits wherein an electrode 56 is utilized which is positively connected in the welding circuit be adopted rather than the conventional circuit 236.

I thus provide by my invention an apparatus which facilitates the assembly of a panel of the honeycomb core reinforced type and which permits the assembly of a core structure as a unit or the assembly of a panel constituted by the core structure and one or more surface sheets adhered or welded thereto.

I also provide by my invention a method of fabricating honeycomb core and honeycomb core reinforced panels whereby the strip or core elements are operatively connected to each other and to the surface sheets of a panel during the weldment of the surface sheets to the core and the simultaneous weldment of the core members or elements to each other. Thus, prior assembly of the core structure before it is inserted between and in operative relationship with the surface sheets is eliminated and the panel can be fabricated as a unit.

Because of the utilization of an electrode positively connected in the welding circuit, I have eliminated the high temperatures generated in the core structure and the eddy and by-pass currents found when conventional welding techniques and circuits are adopted with the results that a more effective weldment is achieved and a stronger and lighter panel obtained.

I claim as my invention:

1. In a method of fabricating a structural panel, the steps of: disposing a pair of electrically conductive surface sheets in spaced relationship with each other; locating an electrically conductive honeycomb core element in the space between said sheets; disposing a supporting electrode of a length at least equivalent to that of said element between said sheets and in contiguity to said core element; and impressing a welding potential across a welding head means disposed in contact with the external surfaces of said sheets and thus across said electrode and said core, said welding head means being continuously movable across said respective external surfaces in paths parallel to the longitudinal axis of said electrode.

2. In a method of fabricating a structural panel, the steps of: locating the external sheets for said panel in spaced relationship with each other, said sheets being formed of electrically conductive material; inserting an electrically conductive honeycomb core strip in the space between said sheets; disposing a welding electrode in said space in contact with said strip, said electrode being of a length at least equivalent to that of said core strip and impressing a welding potential on at least one of said sheets from the external side thereof while the edges of said strip are engaged with the interior surfaces of said sheets to weld said strip and said one sheet in operative relationship with each other by continuously moving welding head means across said sheet in a path parallel to the longitudinal axis of said electrode.

3. In a method of fabricating a composite panel, the steps of: disposing a pair of electrically conductive external panel sheets in spaced relationship with each other; inserting an electrically conductive core strip in the space between said sheets, said strip having right-angularly bent flanges on its opposite edges parallel with said sheets; inserting a welding electrode between said sheets in contiguity with said strip; and impressing a welding potential across said electrode and said sheets to secure the flanges of said strip to said sheets by traversing welding head means across the external surfaces of said sheets in a path parallel to and overlying said flanges.

4. In an apparatus for fabricating a reinforced panel constituted by a core having surface sheets secured to the opposite sides thereof, the combination of: a support for maintaining said surface sheets in spaced relationship; an electrode operatively associated with said support for engagement with a core element; and means for causing relative movement of said electrode and said core with respect to said sheets whereby said core element and electrode are disposed in the space between said sheets to locate said core element in said space.

5. In an apparatus for fabricating a reinforced panel constituted by a core having surface sheets secured to the opposite sides thereof, the combination of: a support for maintaining said surface sheets in spaced relationship; an electrode operatively associated with said support for engagement with a core element; means for causing relative movement of said core element and said electrode with respect to said sheets whereby said electrode and said core element are disposed in the space between said sheets to locate said core element in said space; and welding head means movable across the exteriors of said sheets in paths parallel to the longitudinal axis of said electrode to cause the weldment of said core element to the interior surfaces of said sheets.

6. In an apparatus for fabricating a reinforced panel constituted by a core having surface sheets secured to the opposite sides thereof, the combination of: a support for maintaining said surface sheets in spaced relationship; an electrode operatively associated with said support for engagement with a core element; means for causing relative movement of said electrode and said core element with respect to said sheets whereby said electrode and core element are disposed in the space between said sheets to locate said core element in said space; means for applying pressure to the external surfaces of said sheets to bring the opposite edges of said core element and the inner surfaces of said sheets into engagement; welding head means engageable with the exterior surfaces of said sheets and movable in a path parallel to said surface; and a source of welding potential connected across said welding head means and said electrode whereby said sheets are welded to said core element.

7. In an apparatus for fabricating a reinforced panel constituted by a core having surface sheets secured to the opposite sides thereof, the combination of: a support for maintaining said surface sheets in spaced relationship; a continuous electrode operatively associated with said support for engagement with a core element, said electrode being shaped to conform to the shape of said core element; and means for causing relative movement of said electrode and said core element with respect to said sheets whereby said electrode and core element are disposed in the space between said sheets to locate said core element in said space.

8. In an apparatus for fabricating a reinforced panel constituted by a core having surface sheets secured to the opposite sides thereof, the combination of: a support for maintaining said surface sheets in spaced relationship; a partially insulated electrode operatively associated with said support for engagement with a core element; and means for causing relative movement of said core element and said electrode with respect to said sheets whereby said electrode is disposed in the space between said sheets to locate said core element in said space.

9. In an apparatus for fabricating a reinforced panel constituted by a core having surface sheets secured to the opposite sides thereof, the combination of: a support for maintaining said surface sheets in spaced relationship; a partially insulated electrode operatively associated with said support for engagement with a core element, said electrode being shaped to conform to the shape of said core element; and means for causing relative movement of said electrode and said core element with respect to said sheets whereby said electrode is disposed in the space between said sheets to locate said core element in said space.

10. In an apparatus for simultaneously assembling the core of a core reinforced panel and securing the elements of said core to each other and to the surface sheets of said panel, the combination of: supporting means for maintaining said surface sheets in spaced relationship with each other; an electrode operatively associated with said supporting means for supporting a core element, said electrode being insertible in the space between said sheets; means for inserting said core element supporting electrode in the space between said sheets; a source of welding potential connected to said electrode; and welding head means engageable with said sheets whereby a weld between said sheets and said core element is accomplished.

11. In an apparatus for simultaneously assembling the core of a core reinforced panel and securing the elements of said core to each other and to the surface sheets of said panel, the combination of: supporting means for maintaining said surface sheets in spaced relationship with each other; a partially insulated electrode operatively associated with said supporting means for supporting a core element, said electrode being insertible in the space between said sheets; means for inserting said core element supporting electrode in the space between said sheets; a source of welding potential connected to said electrode; and welding head means engageable with said sheets whereby a weld between said sheets and said core element is accomplished.

12. In an apparatus for simultaneously assembling the core of a core reinforced panel and securing the elements of said core to each other and to the surface sheets of said panel, the combination of: supporting means for maintaining said surface sheets in spaced relationship with each other; an electrode operatively associated with said supporting means for supporting a core element, said electrode being insertible in the space between said sheets; means for inserting said core element supporting electrode in the space between said sheets, said means being constituted by a carriage mounted for movement on said support; a source of welding potential connected to said electrode; and welding head means engageable with said sheets whereby a weld between said sheets and said core element is accomplished.

13. In an apparatus whereby a core reinforced panel is assembled by the simultaneous securement of elements of the core in operative relationship with each other and the surface sheets of said panel, the combination of: a support for maintaining said sheets in spaced relationship with each other; a core element supporting electrode insertible between said sheets with said element disposed thereupon; welding head means engageable with said surface sheets; and a source of welding potential including a primary and a secondary consisting of reverse wound coils whose opposite extremities are connected to said welding head means and whose other extremities are common-connected to said electrode.

14. In an apparatus whereby a core reinforced panel is assembled by the simultaneous securement of elements of the core in operative relationship with each other and the surface sheets of said panel, the combination of: a support for maintaining said sheets in spaced relationship with each other; a core element supporting electrode insertible between said sheets with said element disposed thereupon; welding head means engageable with said surface sheets; and a source of welding potential including a pair of primaries and a pair of secondaries, said primaries being connected in series and said secondaries being connected in inverse parallel to said welding head means and said electrode.

15. In an apparatus whereby a core reinforced panel is assembled by the simultaneous securement of elements of the core in operative relationship with each other and the surface sheets of said panel, the combination of: a support for maintaining said sheets in spaced relationship with each other; a core element supporting electrode insertible between said sheets with said element disposed thereupon; and adapted to insert portions of said core element thereupon within corresponding portions of a juxtaposed core element; a welding head engageable with said surface sheets; and a source of welding potential connected to said electrode and said head.

16. In an apparatus whereby a core reinforced panel is assembled by the simultaneous securement of elements of the core in operative relationship with each other and the surface sheets of said panel, the combination of: a support for maintaining said sheets in spaced relationship with each other; a core element supporting electrode insertible between said sheets with said element disposed thereupon; a welding head engageable with said surface sheets; and a source of welding potential including a plurality of primaries and an equal plurality of secondaries, certain of said secondaries being connected to said welding head on one side of said sheets and to said electrode, and the remainder of said secondaries being connected to said welding head on the other side of said sheets and to said electrode.

17. In an apparatus whereby a core reinforced panel is assembled by the simultaneous securement of elements of the core in operative relationship with each other and the surface sheets of said panel, the combination of: a support for maintaining said sheets in spaced relationship with each other; a core element supporting electrode insertible between said sheets with said element disposed thereupon; a welding head engageable with said surface sheets; and a source of welding potential including three-phase power input, a three-phase, open delta wound transformer, said welding head being connected to the opposite sides of the secondary and said electrode being connected to the center tap of said secondary.

18. In a method of assembling a core reinforced panel by welding channeled and corrugated elements of said core in operative relationship with each other and the surface sheets of said panel, the steps of: disposing said sheets in spaced relationship; inserting an electrode bearing a core element in the space between said sheets with the flanges of said channel on opposite sides thereof; engaging each sheet with a welding element in the area of said electrode; exerting pressure on said welding elements to cause said sheets to engage the opposite flanges of said core element; impressing a welding potential on said electrode by causing current flow from said electrode through said core element, said sheets, and to said welding elements; and successively inserting said element bearing electrode between portions of the last welded element to locate portions of the element on said electrode within said last welded element.

19. In a method for simultaneously assembling the honeycomb core of a core reinforced panel and securing the elements of said core to each other and to the surface sheets of said panel, the steps of: locating a pair of surface sheets in spaced relationship with each other; inserting a first corrugated core element having right-angularly bent flanges on its opposite edges between said sheets with said flanges in contact with the interior surfaces of said sheets; welding said flanges of said core element to the interior surfaces of said sheets; inserting a second core element in said space between said sheets; fitting the nodes on said second element within the flanges of said first element; and simultaneously welding the interfitted flanges on said first and second core elements and said sheets to each other.

20. In a method for simultaneously assembling the honeycomb core of a core reinforced panel and securing the elements of said core to each other and to the surface sheets of said panel, the steps of: locating a pair of surface sheets in spaced relationship with each other; inserting a first corrugated core element having right-angularly formed flanges on its opposite edges between said sheets with said flanges in contact with the interior surfaces of said sheets; welding said flanges of said core to the interior surfaces of said sheets; inserting a second core element in said space between said sheets; shifting said second element one-half wave form to properly align its nodes with said first element; fitting the nodes on said second element within the flanges of said first element; and simultaneously welding the interfitted flanges on said first and second core elements and said sheets to each other.

21. In a method for simultaneously assembling and securing the wave-form elements of a honeycomb-type core in operative relationship with a supporting sheet, said elements having right-angularly oriented flanges on the edges thereof, the steps of: juxtaposing the flange of a first element to said sheet; welding said flange to said sheet; internesting the flange on apices of a second element within the flange between the apices of the first element; and simultaneously welding the internested portions of said flanges of said first and second elements to each other and said sheet at said apices and the unnested portions of flanges of said second element to said sheet.

22. In a method for simultaneously assembling and securing the wave-form elements of a honeycomb-type core in operative relationship with a supporting sheet, said elements having right-angularly oriented flanges on the edges thereof, the steps of: juxtaposing the flange of a first element to said sheet; welding said flange to said sheet; shifting the wave forms of a second element one-half wave form out of phase with the wave forms of said first element; internesting the flange on the apices of said second element within the flange between the apices of the first element; and simultaneously welding the internested portions of said flanges of said first and second elements to each other and said sheet at said apices and the unnested portions of flanges of said second element to said sheet.

23. In a method of fabricating a panel consisting of opposed surface sheets with an internal spacer element disposed between said sheets and having its edges juxtaposed to the inner surfaces of said sheets, the steps of: applying a welding potential to the outer surface of one of said surface sheets by moving welding head means in a longitudinal path on said outer surface; applying a mating potential to the juxtaposed edge of said spacer element; applying a second welding potential to the outer surface of the other of said surface sheets by moving welding head means in a longitudinal path on said outer surface; and applying a mating potential to the juxtaposed edge of said spacer element.

References Cited in the file of this patent

UNITED STATES PATENTS

| | | |
|---|---|---|
| 1,042,885 | Budd et al. | Oct. 29, 1912 |
| 1,052,753 | Rietzel | Feb. 11, 1913 |
| 1,943,259 | Hughes | Jan. 9, 1934 |
| 1,944,106 | Ragsdale | Jan. 16, 1934 |
| 2,056,563 | Budd et al. | Oct. 6, 1936 |
| 2,747,064 | Pappelendam | May 22, 1956 |
| 2,780,716 | Wasilisin et al. | Feb. 5, 1957 |
| 2,820,882 | Johnson | Jan. 21, 1958 |